(12) United States Patent
Oshima

(10) Patent No.: US 9,488,897 B2
(45) Date of Patent: Nov. 8, 2016

(54) SINGLE PHOTON GENERATOR AND SINGLE-PHOTON GENERATING METHOD

(71) Applicant: FUJITSU LIMITED, Kawasaki-shi, Kanagawa (JP)

(72) Inventor: Toshio Oshima, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/938,308

(22) Filed: Nov. 11, 2015

(65) Prior Publication Data

US 2016/0178984 A1    Jun. 23, 2016

(30) Foreign Application Priority Data

Dec. 22, 2014 (JP) ................................ 2014-258848

(51) Int. Cl.
G02F 1/35    (2006.01)
G02F 1/365   (2006.01)
G02F 1/355   (2006.01)

(52) U.S. Cl.
CPC ............ *G02F 1/365* (2013.01); *G02F 1/3556* (2013.01)

(58) Field of Classification Search
None
See application file for complete search history.

(56) References Cited

U.S. PATENT DOCUMENTS

2002/0196827 A1* 12/2002 Shields ................. B82Y 20/00
                                                    372/45.01
2007/0228373 A1* 10/2007 Takemoto ............. H04L 9/0858
                                                    257/53
2010/0258784 A1* 10/2010 Lukin .................... B82Y 20/00
                                                    257/10

FOREIGN PATENT DOCUMENTS

JP    2006-066463    3/2006
JP    2007-335503    12/2007

OTHER PUBLICATIONS

Paul G. Kwiat et al., "New High-Intensity Source of Polarization-Entangled Photon Pairs", Physical Review Letters, vol. 75, Dec. 11, 1995, No. 24, pp. 4337-4341 (6 pages).
G. S. Solomon et al., "Single-mode Spontaneous Emission froma Single Quantum Dot in a Three-Dimensional Microcavity", Physical Review Letters, vol. 86, No. 17, Apr. 23, 2001, pp. 3903-3906 (4 pages).
C. H. Bennett et al., "Experimental Quantum Cryptography", Journal of Cryptology, vol. 5, 1992, pp. 3-28 (26 pages).

* cited by examiner

*Primary Examiner* — Hemang Sanghavi
(74) *Attorney, Agent, or Firm* — Fujitsu Patent Center

(57) ABSTRACT

The invention relates to a single-photon generator and a single-photon generating method, which theoretically makes it possible to precisely generate a single photon in real time. A three-level lambda system is formed of a coupled quantum dots group, which is a set of a number of coupled quantum dots where a couple of quantum dots having different ground quantum levels are coupled. The entirety is made in an exciton ground state through illumination with first excitation light. Then, the number of photons in the Raman scattering light through illumination with second excitation light is detected, and a single excited Dicke state is achieved. After that, a single photon is generated accompanying the transition from the single excited Dicke state to the exciton ground state through illumination with third excitation light.

10 Claims, 13 Drawing Sheets

|G> ⟶ |G> and  0 Stokes photon
      + $f_1$ |$S_1$> and  1 Stokes photon
      + $f_2$ |$S_2$> and  2 Stokes photon
      + .....

SINGLE PHOTON GENERATOR AND SINGLE-PHOTON GENERATING METHOD

CROSS-REFERENCE TO RELATED APPLICATION

This application is based upon and claims the benefit of priority of the prior Japanese Patent Application No. 2014-258848, filed on Dec. 22, 2014, the entire contents of which are incorporated herein by reference.

FIELD

The present invention relates to a single-photon generator and a single-photon generating method, and in particular to a single-photon generator and a single-photon generating method for generating a single photon that can be used as a information carrier in quantum cryptography communication or quantum computation.

BACKGROUND

In many cases, photons are used as information carriers in quantum cryptography communication or quantum computation. The methods for generating such a photon include a conventional laser, a spontaneous emission of quantum dots or coupled quantum dots, and a parametric down-conversion using a non-linear optical crystal.

In quantum cryptography communication, particularly in quantum key distribution (QKD), a photon, which is a quantum information carrier, is transmitted through an optical fiber. Usually, one photon carries one quantum bit, which is a unit for quantum information. There are several possible methods for generating such a photon.

First, a method for using weak coherent light due to a conventional laser can be cited. Second, a method for using a spontaneous emission of quantum dots can be cited. Third, a method for using a spontaneous emission of coupled quantum dots can be cited. And fourth, a method for using parametric down-conversion utilizing a non-linear optical crystal can be cited.

Patent Document 1: Japanese Laid-open Patent Publication No. 2006-066463

Patent Document 2: Japanese Laid-open Patent Publication No. 2007-335503

Non-Patent Document 1: P. G. Kwiat et al., Physical Review Letters, vol. 75 p. 4337 (1995)

Non-Patent Document 2: G. S. Solomon et al., Physical Review Letters, vol. 86, p. 3903 (2001)

Non-Patent Document 3: C. H. Bennett et al., Journal of cryptology, vol. 5, p. 3 (1992)

SUMMARY

In the case where weak coherent light due to a conventional laser is used, a pulse that includes two or more photons is generated at a low probability. Accordingly, a wire-tapper can extract one photon from the pulse, which makes it possible to tap into the information (photon number splitting: PNS).

This can be avoided by:
(1) highly weakening the pulse intensity so that the average photon number per pulse becomes 0.1 or less;
(2) using a protocol having the tolerance against PNS attack, such as a decoy method; and
(3) adding a process, such as an increase in concealment.

However, they all have such a problem that the transmission rate may be lowered or the communication distance may be shortened, which negatively affects the system.

In the case where a spontaneous emission of quantum dots is used, the relative probability of two photons $g^{(2)}$ is considerably reduced; however, the possibility of a multiple exciton state is not zero, and therefore, the two-photon possibility cannot be completely made zero. Conversely, the frequency of the two-photon event itself is not reduced, and therefore, the tolerance against PNS attack does not increase very much. In addition, such a problem arises that the timing according to which a pulse is generated becomes stochastic, which makes its usage for quantum computation or the like impossible.

In the case where a spontaneous emission of coupled quantum dots is used, it is possible to keep the probability of two photons considerably low; however, such a problem arises that the timing according to which a pulse is generated becomes stochastic in the same manner, which also makes its usage for quantum computation or the like impossible.

In the case where parametric down-conversion utilizing a non-linear optical crystal is used, the timing according to which photons are generated can be controlled; however, the probability of two photons cannot yet be made zero, and therefore, the pump intensity should be kept low. By doing this, single-photon properties can be secured; however, the probability of down-conversion is small, which not only makes the rate extremely small but also makes the majority of the system clock read as time slots of failure. It is possible to arrange a large number of such devices in parallel so that any one of these devices can generate a single photon. However, such a problem arises that the number of generated photons are in Poisson's distribution, which makes the system for sensing and selecting generated photons and feeding them into a communication path or a quantum gate by switching the optical path in real time extremely complicated.

According to one aspect of the disclosure, a single-photon generator is provided with includes: a coupled quantum dots group, which is a set of a number of coupled quantum dots made of a coupled pair of quantum dots having different ground quantum levels; a first pumping light illumination equipment for illuminating the coupled quantum dots group with first excitation light so that a multiple number of coupled quantum dots are made to be in an exciton ground state; a second pumping light illumination equipment for illuminating the coupled quantum dots group in the exciton ground state with second excitation light so that the coupled quantum dots group is made in the excited Dicke state through Raman scattering; a photon number detection equipment for detecting the number of photons in the Raman scattering light due to the Raman scattering; a control means for controlling the second pumping light illumination equipment so that the excited Dicke state becomes a single excited Dicke state using the detection results by the photon number detection equipment; and a third pumping light illumination equipment for illuminating the coupled quantum dots group in the single excited Dicke state with third excitation light so that a single photon is generated accompanying the transition of the coupled quantum dots group from the single excited Dicke state to the exciton ground state due to Raman scattering.

According to another aspect of the disclosure, a single-photon generating method includes: illuminating a coupled quantum dots group, which is a set of a number of coupled quantum dots where a couple of quantum dots having different ground quantum levels are coupled, with first excitation light so that a multiple number of coupled quantum dots are made in an exciton ground state; illuminating the coupled quantum dots group in the exciton ground state with second excitation light so that the exciton ground state becomes a single excited Dicke state using the detection results by a photon number detection means that detects the number of photons in the Raman scattering light due to Raman scattering; and illuminating the coupled quantum dots group in the single excited Dicke state with third excitation light so that a single photon is generated accompanying the transition of the coupled quantum dots group from the single excited Dicke state to the exciton ground state due to Raman scattering.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
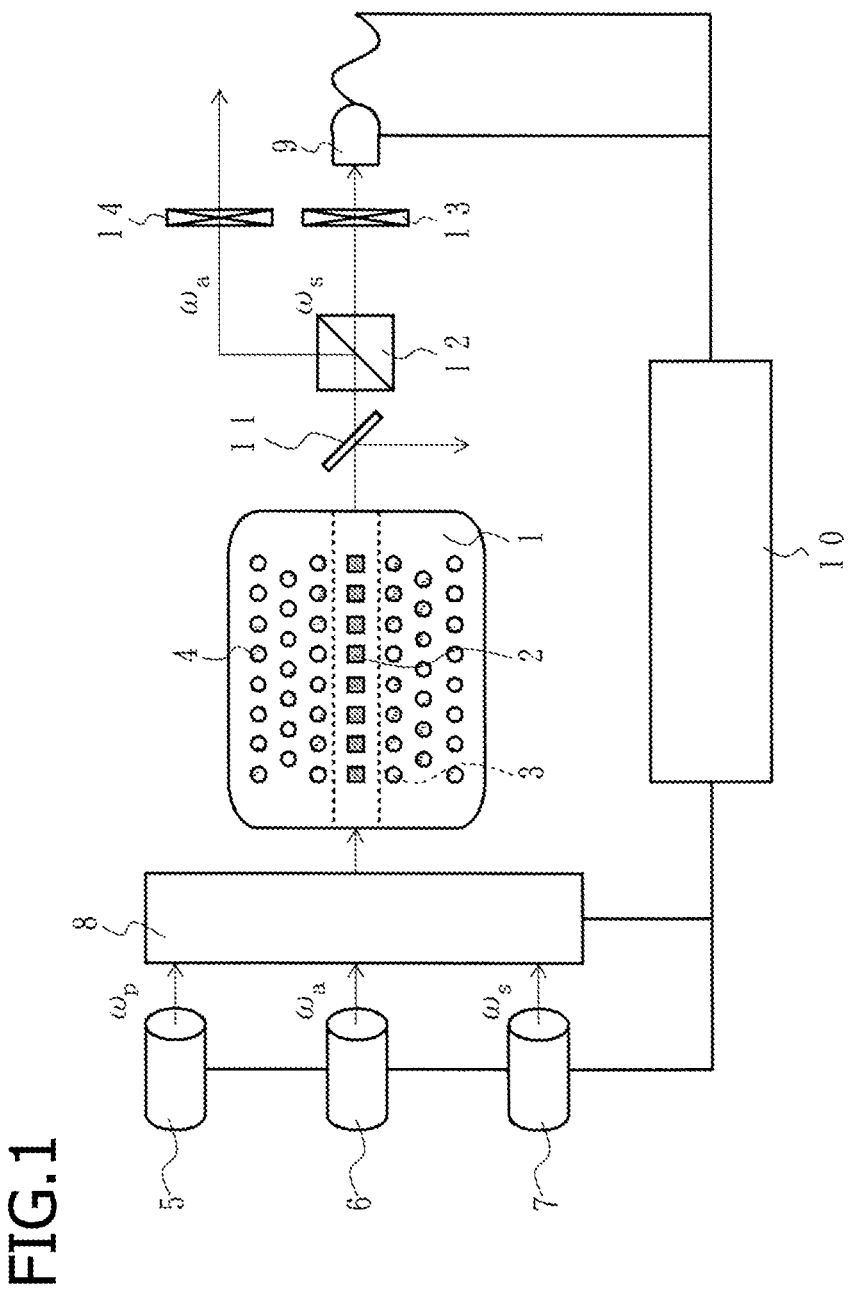
FIG. 1 is a schematic diagram illustrating the configuration of a single-photon generator used in the single-photon generating method according to the embodiment of the present invention.

In reference to FIG. 1, the single-photon generating method according to one embodiment of the present invention is described. FIG. 1 is a schematic diagram illustrating the configuration of a single-photon generator used in the single-photon generating method according to the embodiment of the present invention. The single-photon generator is provided with a coupled quantum dots group 1, which is a set of a number of coupled quantum dots 2 where a pair of quantum dots having different ground quantum levels are coupled, and a first pumping light illuminator 5 for illuminating the coupled quantum dots group 1 with first excitation light $\omega_p$ so that a great number of, ideally all of the, coupled quantum dots 2 are made in the exciton ground state $|G\rangle$.

The single-photon generator is also provided with a second pumping light illuminator 6 for illuminating the coupled quantum dots group 1 in the exciton ground state $|G\rangle$ with second excitation light $\omega_a$ so that the coupled quantum dots group 1 is made in an excited Dicke state $|S\rangle$ due to Raman scattering, and a photon number detector 9 for detecting the number of photons in the Raman scattering light $\omega_s$ due to the Raman scattering. The single-photon generator is provided with a controller 10 for controlling the second pumping light illuminator 6 so that the excited Dicke state $|S\rangle$ is converted to a single excited Dicke state $|S_1\rangle$ using the detection results of the photon number detector 9. Here, it is desirable for the second excitation light $\omega_a$ to be a non-resonant laser beam.

The single-photon generator is also provided with a third pumping light illuminator 7 for illuminating the coupled quantum dots group 1 in the single excited Dicke state $|S_1\rangle$ with third excitation light $\omega_s$ so that a single photon $\omega_a$ is generated accompanying the transition from the single excited Dicke state $|S_1\rangle$ to the exciton ground state $|G\rangle$ due to Raman scattering.

The first pumping light illuminator 5, the second pumping light illuminator 6, and the third pumping light illuminator 7 are controlled by a light switch 8 and a controller 10. In addition, the light switch 8 and the photon number detector 9 are controlled by the controller 10. The excitation light or the Raman scattering light that has transmitted through the coupled quantum dots group 1 enters into a dichroic mirror 11 so that the excitation light is reflected and removed, whereas the Raman scattering light and light having other wavelengths are allowed to transmit.

The Raman scattering light and other light are branched by a beam splitter 12. The Stokes ray that has transmitted through a filter 13 enters into the photon number detector 9, whereas the anti-Stokes ray transmits through a filter 14 and is then used for quantum key distribution (QKD) or a quantum computation scheme (KLM).

It is desirable for the coupled quantum dots group 1 to have pairs of coupled quantum dots where a quantum dot in the first layer in a Stranski-Krastanov (SK) growth mode and a quantum dot in the second layer formed so as to be positionally aligned above the quantum dot in the first layer with a middle layer in between are coupled. The use of this multilayer structure allows coupled quantum dots to be efficiently formed. Here, the coupled quantum dots may be pairs of quantum dots that are arranged in the same plane in close proximity.

Typically, SK mode grown InAs quantum dots formed on a semiconductor substrate is highly possible. In this case, the diameter of the dots is approximately 10 nm to 100 nm. The band gap is in a range from 0.5 eV to 2.0 eV, for example. It is necessary for the number of coupled quantum dots 2 in the coupled quantum dots group 1 to be at a certain level in order to increase the SN ratio or the directivity when an effective single photon is generated, and thus, the number of coupled quantum dots is approximately 100 to $10^6$, for example.

In addition, it is desirable for the coupled quantum dots 2 in the coupled quantum dots group 1 to be linearly aligned along the respective optical axes of the first through third excitation light $\omega_p$, $\omega_a$ and $\omega_s$, which allows the respective excitation light to work efficiently so that the efficiency in the generation of a single photon, the SN ratio, and the directivity can be increased.

As described above, it is desirable for the linearly aligned coupled quantum dots group 1 to be placed inside the optical waveguide 3 so as to ensure that light enters and emits with directivity. The optical waveguide 3 may either be a mesa type optical waveguide or an optical waveguide 3 made of a photonic crystal 4.

In order to effectively use the excitation light so that the excitation light works effectively, the optical waveguide 3 that includes the linearly aligned coupled quantum dots group 1 may be placed inside a Fabry-Perot type resonator. Alternatively, the optical waveguide 3 that includes the linearly aligned coupled quantum dots group 1 may be placed inside a ring type resonator.

Figure 2A:
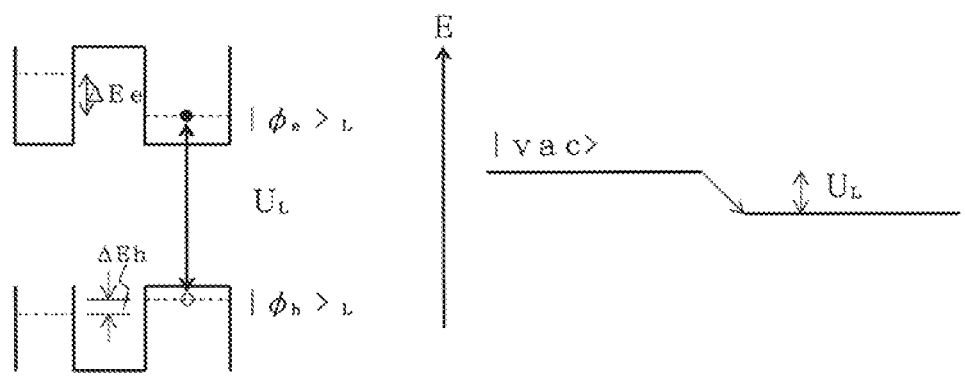
FIGS. 2A and 2B are diagrams illustrating the exciton localized state of coupled quantum dots.

Next, a method for generating a single photon using the above-described single-photon generator is described in reference to FIGS. 2A to 7. First, the energy states of coupled quantum dots are described in reference to FIGS. 2A to 3B. FIGS. 2A and 2B are diagrams illustrating the exciton localized state of coupled quantum dots. The left side of the figures is a band diagram and the right side of the figures illustrates the energy shift due to the Coulomb binding energy. FIG. 2A illustrates a state where an exciton having an electron and a hole paired in a quantum dot having a large size is localized, which is represented by |vac>. As illustrated in the left side diagram, the electron and the hole are trapped in the respective ground quantum levels of the quantum dot having a large size, and thus are bound to each other due to the Coulomb binding energy $U_L$. Accordingly, as illustrated in the right side graph, the exciton is in the state of being shifted from |vac> by the Coulomb binding energy $U_L$. Here, $|vac\rangle = |\phi_e\rangle_L |\phi_h\rangle_L$ when $\phi e$ is a wave function of electrons, $\phi_h$ is a wave function of holes, and suffixes L and S are the sizes of the quantum dot.

Figure 2B:
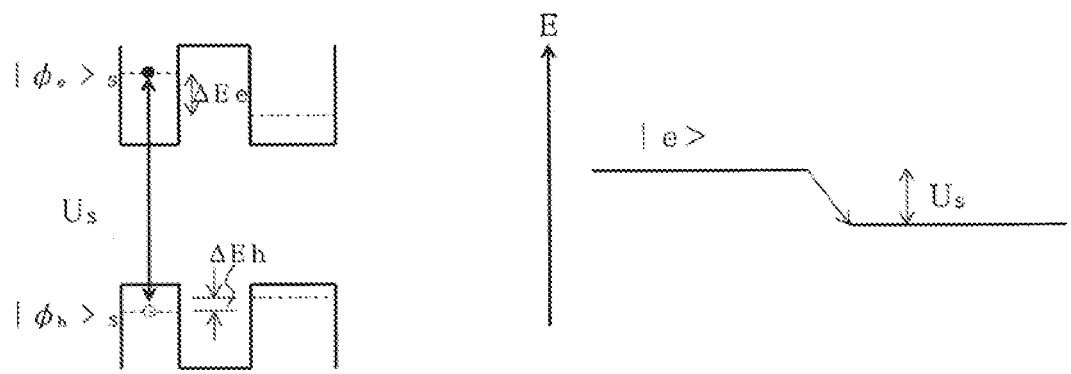

FIG. 2B illustrates a state where an exciton is localized in a quantum dot having a small size, which is represented by |e>. As illustrated in the left side diagram, the electron and the hole are trapped in the respective ground quantum levels of the quantum dot having a small size, and thus are bound to each other due to the Coulomb binding energy $U_S$. Accordingly, as illustrated in the right side graph, the exciton is in the state of being shifted from |e> by the Coulomb binding energy $U_S$. Here, $|e\rangle = |\phi_e\rangle_S |\phi_h\rangle_S$. In addition, the difference in the ground quantum level between the small quantum dot and the large quantum dot is $\Delta E_e$ on the conduction band side and $\Delta E_h$ on the valence band side. The energy shift $U_L$, $U_S$ due to the Coulomb binding energy is approximately 10 meV to approximately 30 meV for an SK quantum dot having a diameter of approximately 20 nm.

Figure 3A:
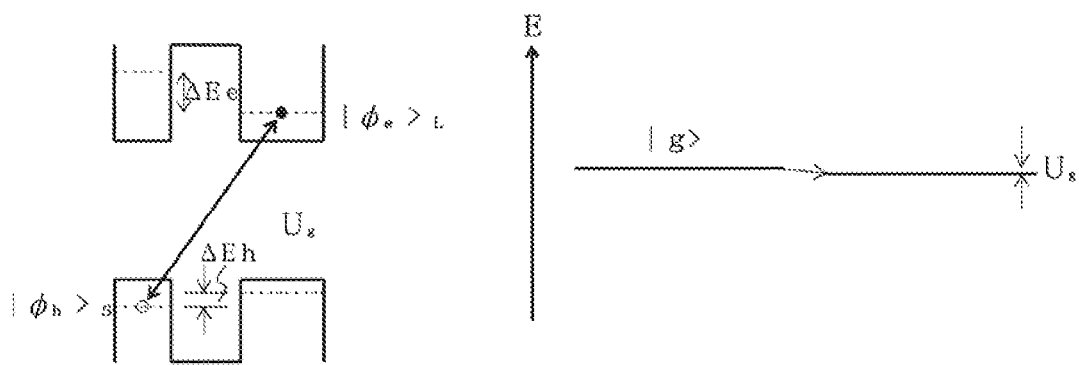
FIGS. 3A and 3B are diagrams illustrating the exciton separation state of coupled quantum dots.
Figure 3B:
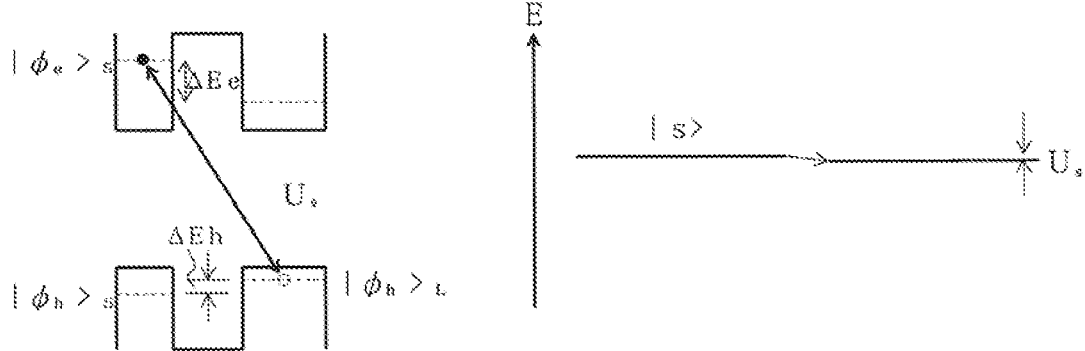

FIGS. 3A and 3B are diagrams illustrating the exciton separation state of coupled quantum dots. The left side diagrams are band diagrams, and the right side graphs illustrate the energy shift due to the Coulomb binding energy. FIG. 3A illustrates the state where the electron is trapped in the ground quantum level of the quantum dot having a large size and the hole is trapped in the ground quantum level of the small quantum dot, and this state is represented by |g>. As illustrated in the left side diagram, the electron and the hole are bound by the Coulomb binding energy $U_g$. Accordingly, as illustrated in the right side graph, the energy level is shifted from |g> by the Coulomb binding energy $U_g$ in this state; however, this binding is between different quantum dots and the binding becomes smaller inversely proportional to the distance, and therefore, it is usually set to $U_g = 0$. Here, $|g\rangle = |\phi_e\rangle_L |\phi_h\rangle_S$.

FIG. 3B illustrates the state where the electron is trapped in the ground quantum level of the quantum dot having a small size and the hole is trapped in the ground quantum level of the large quantum dot, and this state is represented by |s>. As illustrated in the left diagram, the electron and the hole are bound by the Coulomb binding energy $U_s$. Accordingly, as illustrated in the right side graph, the energy level is in the state shifted from |s> by the Coulomb binding energy $U_s$; however, the binding is between different quantum dots and the binding becomes smaller inversely proportional to the distance squared, and therefore, it is usually set to $U_s = 0$. Here, $|s\rangle = |\phi_e\rangle_S |\phi_h\rangle_L$.

Figure 4:
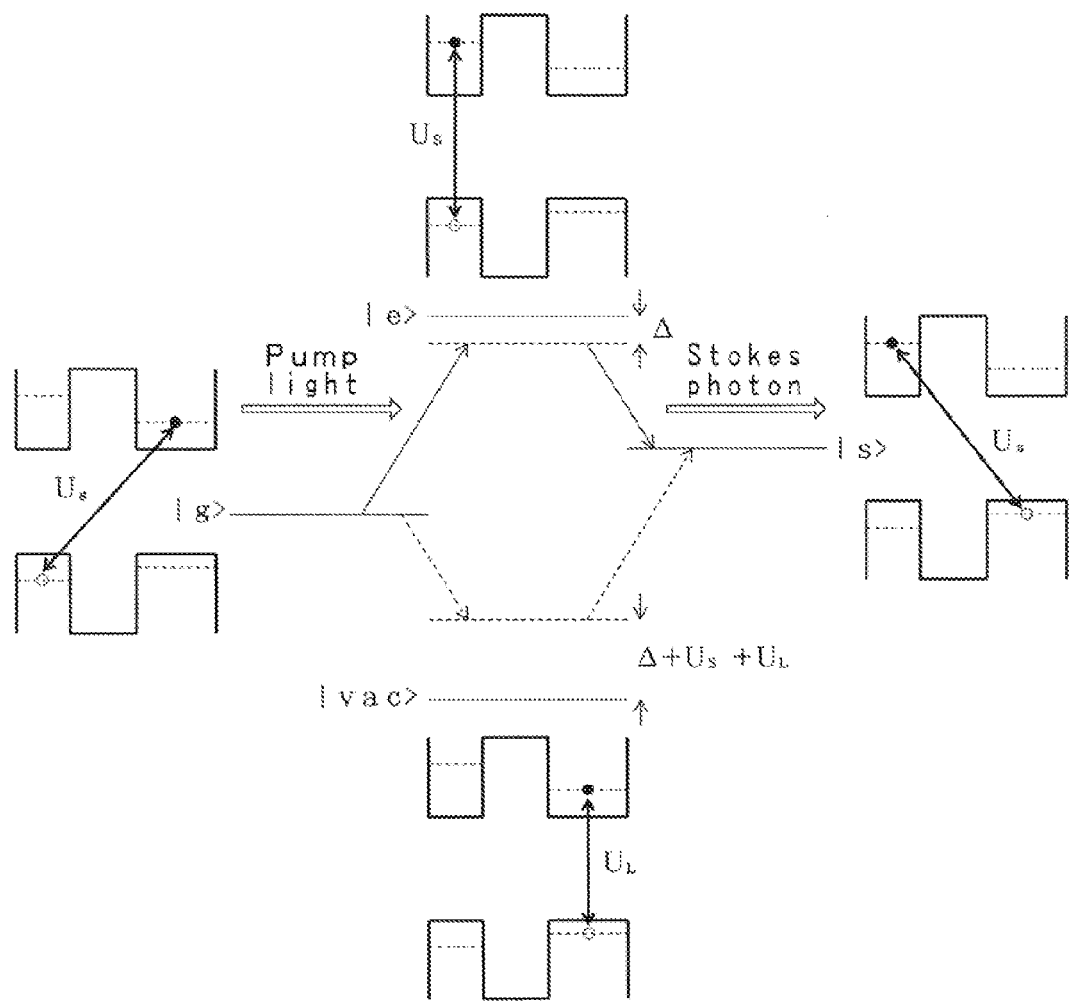
FIG. 4 is a diagram showing the configuration of a three-level lambda system using an exciton in the coupled quantum dots.

FIG. 4 is a diagram showing the configuration of a three-level lambda system using an exciton in the coupled quantum dots. Here, four energy states |vac>, |g>, |s> and |e> are depicted in the order from the lowest to the highest energy state. It is known in the three-level system, which is referred to as the lambda system, that a so-called Raman scattering where the wavelength of the incident light and the scattering light are different from each other occurs. In the Raman scattering, the quantum state transitions of the scattered light and the three-level system (scattering medium) correspond one to one, and therefore, the quantum state of the three-level system after scattering can be confirmed by measuring the scattered light.

The system of coupled quantum dots formed in the above-described manner is a rhombus four-level system of |g>, |s>, |e> and |vac>. Therefore, the Raman process due to |g>, |vac> and |s> and the real transition between |s> and |vac> contribute in addition to the Raman process due to |g>, |s> and |e>, and thus, the physical process is complex, which makes normal operation control difficult.

However, the energy shifts by the Coulomb binding energy between |e> and |vac>. Therefore, as for the detuning energy, which relates to the Raman transition, the value that relates to |g>, |vac> and |s> is greater than the value that relates to |g>, |e> and |s> by the sum of the Coulomb binding energy $U_L + U_S$. Thus, the greater the detuning energy is, the smaller the transition amplitude is in inverse proportion, and therefore, the contributions of the Raman process due to |g>, |vac> and |s> and the real transition are suppressed to a great extent. Accordingly, the lambda system is formed as a system of |g>, |e> and |s> here.

When the difference in the energy between |g> and |e> is $E_1$ and the difference in the energy between |s> and |e> is $E_2$, the difference in the energy of the ground quantum level between the two quantum wells on the conduction band side is $\Delta E_e$, and the difference in the energy of the ground quantum level between the two quantum wells on the valence band side is $\Delta E_h$, then $$E_1 = E(|e\rangle) - E(|g\rangle) = \Delta E_e - U_S$$

$$E_2 = E(|e\rangle) - E(|s\rangle) = \Delta E_h - U_S$$

Figure 5:
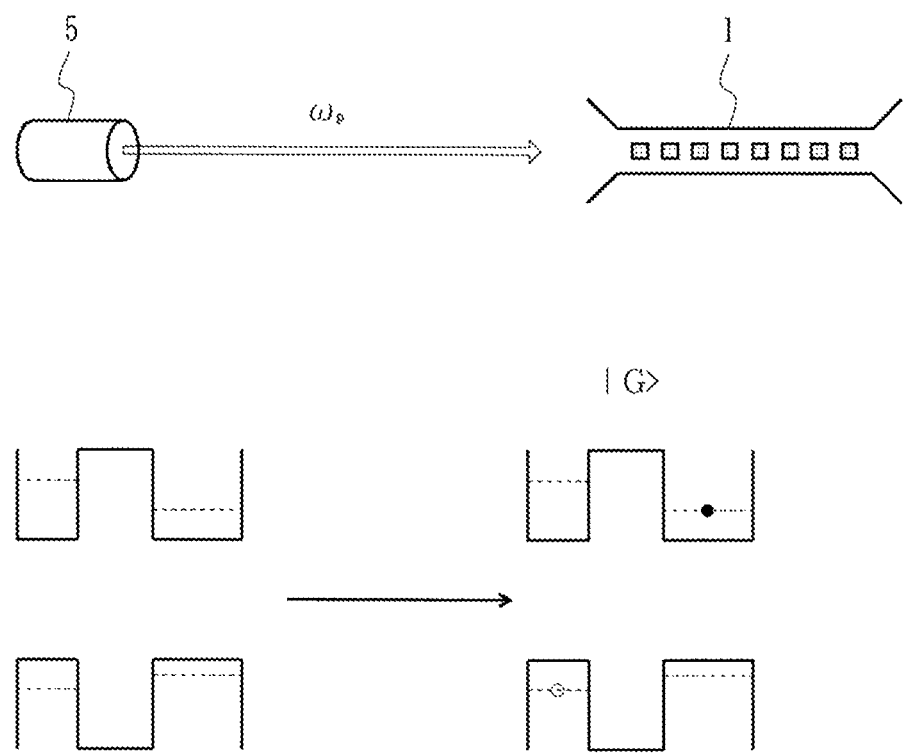
FIG. 5 is a diagram illustrating the first step of the single-photon generating method
Figure 6:
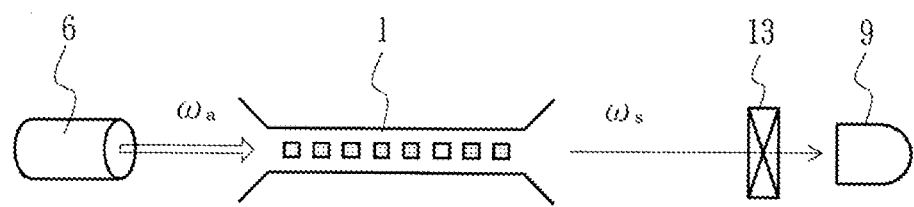
FIG. 6 is a diagram illustrating the second step of the single-photon generating method
Figure 6:
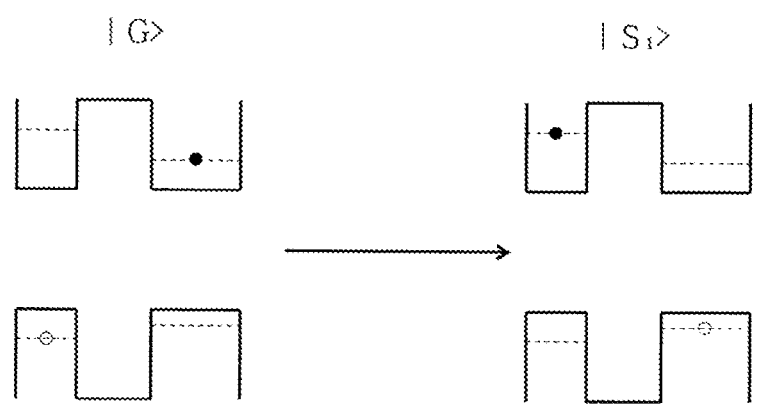
Figure 7:
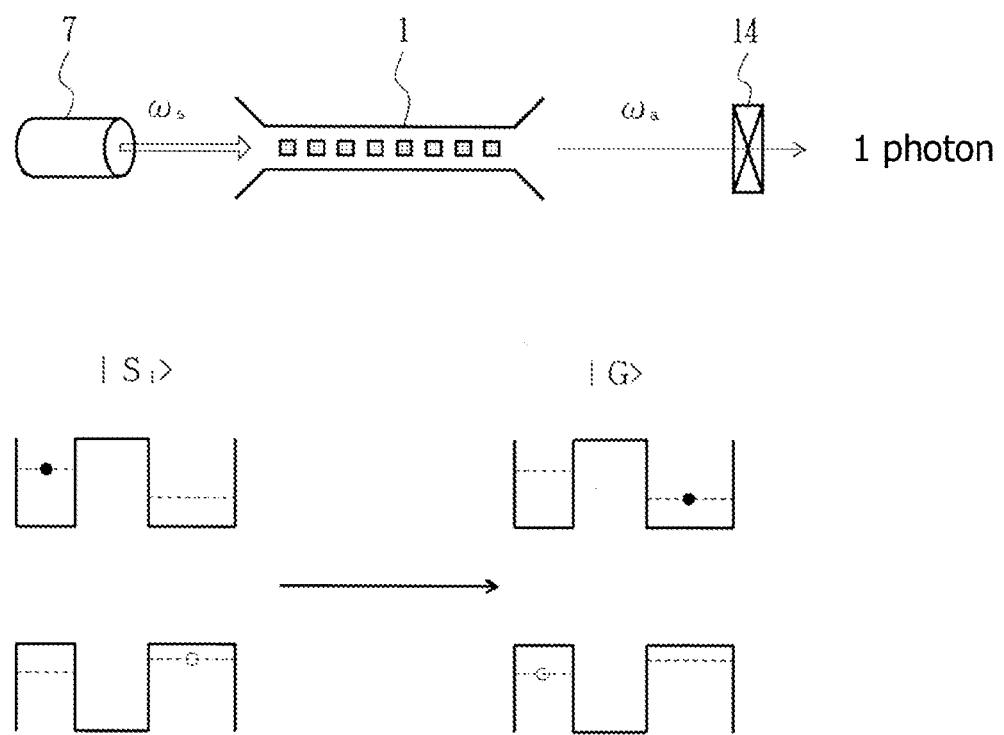
FIG. 7 is a diagram illustrating the third step of the single-photon generating method

Next, a single-photon generating method is described in reference to FIGS. 5 to 7. FIG. 5 is a diagram illustrating the first step of the single-photon generating method where a coupled quantum dots group 1 is illuminated with first excitation light $\omega_P$ so as to generate the exciton ground state |g>, and thus, initialization is carried out. All of the coupled quantum dots 2 are in the state where there are no excitons before initialization and are converted to the |g> state, that is the |G> state, when illuminated with the first excitation light $\omega_P$ of which the energy is no smaller than that in the $|g\rangle$ state and no greater than that in the $|s\rangle$ state.

Accordingly, the wavelength $\lambda_P$ of the first excitation light $\omega_P$ ($=2\pi c/\omega_P$) corresponds to the band gap of the material of the quantum dots to which the sum of the binding energies within the dots of the electrons and holes corresponding to the $|g\rangle$ state are added. In the resonant excitation, this energy is tuned with $\omega_P$. In the non-resonant excitation, the energy is set at a level a bit higher than that. In the case of the quasi-resonant excitation, there is a wait until the energy drops to the ground state within the band, such as phonon scattering. The time required for this is 1 ns or less. In the case of either the resonant excitation or the quasi-resonant excitation, the purity of the spectrum of the excitation light is irrelevant, and it is sufficient to use a conventional laser.

FIG. 6 is a diagram illustrating the second step of the single-photon generating method. The coupled quantum dots group 1 is converted to the Dicke state $|S\rangle$ when illuminated with second excitation light $\omega_a$. The Dicke state $|S\rangle$ can be represented as the overlapping of $|S\rangle = (|G\rangle + 0$ photon$)+(f_1|S_1\rangle+\omega_S)+(f_2|S_2\rangle+2\omega_S)+\ldots$. Here, $2\omega_S$ represents the fact that two coupled quantum dots 2 is excited to the $|s\rangle$ state so that two Stokes rays $\omega_S$ are released. Therefore, this Raman scattered light $\omega_S$ is measured by a photon number detection means 9. Thus, it is determined that the coupled quantum dots group 1 is in the single Dicke state $|S1\rangle$, and the preparation for the single-photon generation is completed at the time of $f_1|S_1\rangle+\omega_S$ where the photon number is 1, that is to say, when only one pair of coupled quantum dots 2 is excited to the $|s\rangle$ state so as to be in a coherent state. Here, $1 \gg f_1 \gg f_2 \ldots$.

The real photon number detector 9 cannot determine the number without an error. Even in this case, the probability of two or more photons can be made smaller as much as possible at the stage of photon generation when the intensity of the second excitation light $\omega_a$ is sufficiently small. In the case where a photon number detector cannot be used, the detection of the number is possible with a conventional threshold value detector when simultaneously detected via beam splitters in multiple stages. In the present system, a device of which the single excitation Dicke state was confirmed is prepared in advance, and this may be sequentially consumed. Therefore, there is a great advantage as compared to the SPDC where selection must be in real time.

FIG. 7 is a diagram illustrating the third step of the single-photon generating method where an anti-Stokes ray $\omega_a$, which is Raman scattered light, is taken out through illumination with third excitation light $\omega_S$ at the point in time when a single photon becomes necessary. Part of the energy of the third excitation light is converted to an anti-Stokes ray $\omega_a$ upon the reception of Raman scattering when a non-resonant pump beam having energy that is smaller than the difference in the energy between the energy state $|s\rangle$ that is higher in the exciton separation state and the energy state $|e\rangle$ that is higher in the exciton localization state enters, where the anti-Stokes ray $\omega_a$ has a wavelength shorter than that of the non-resonant pump beam. The Raman scattered light $\omega_a$ is released from the coupled quantum dots group 1 in the single Dicke state $|S_1\rangle$, and therefore, a single photon is theoretically guaranteed.

In the embodiment of the present invention, single excitation of the system, that is selection after the event through the detection of the number of photons in the scattered light, is assured in the excitation process with a second excitation light, and therefore, the process moves to the next photon generation step only in the case of single excitation. Thus, single excitation of the system has once been confirmed, and therefore, only a single photon is generated. In addition, the probability of the single excitation state of the system naturally transiting to the multiple excitation state can be ignored because $f_1 \gg f_2 \ldots$.

As described above, in the embodiment of the present invention, the precise generation of a single photon is theoretically possible, and thus, the object of the invention is achieved. Furthermore, the generation of a single photon instantly occurs at the time of illumination with third excitation light, and therefore, application to quantum computation or the like that requires an on-demand photon source is also possible. Moreover, a photon can be driven into all the slots of the clock in the system for quantum cryptography communication because of the on-demand property, and therefore, the designing of the system is easy where the operation efficiency and the rate are high.

Examples of the other effects include the points where integration and total solidification are possible, and a quantum communication system and a quantum computer can be constructed as compact modules in the same manner as existing communication systems and computers. In the case where a single photon is used for quantum cryptography communication, it is desirable for the difference in the energy between $|e\rangle$ and $|g\rangle$ to be higher than the energy of the transmission band of the optical fiber (1.3 μm or 1.55 μm) by the detuning amount $\Delta$. This corresponds to the wavelength of the second excitation light. In the case of application to quantum computation, there are no restrictions on the wavelength from the optical fiber transmission.

Example 1

Figure 8A:
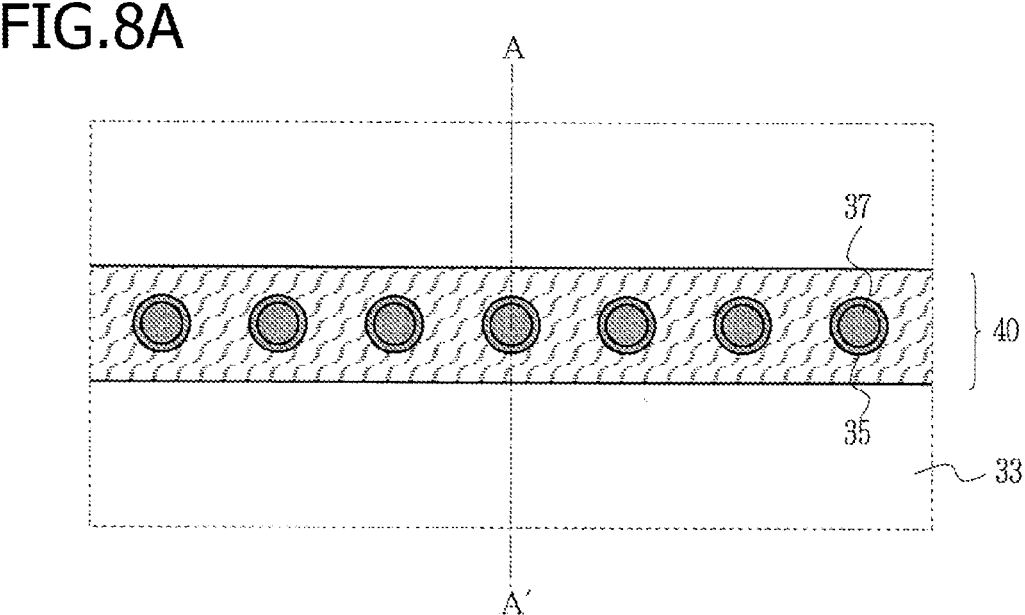
FIGS. 8A and 8B are diagrams illustrating the main portion of the single-photon generator according to Example 1 of the present invention.

Next, the single-photon generator according to Example 1 of the present invention is described in reference to FIGS. 8A to 9F. FIGS. 8A and 8B are diagrams illustrating the main portion of the single-photon generator according to Example 1 of the present invention. Here, a coupled quantum dots group for realizing a three-level lambda system is described. FIG. 8A is a schematic diagram and FIG. 8B is a cross-sectional diagram along single-dotted chain line A-A' in FIG. 8A.

Figure 8B:
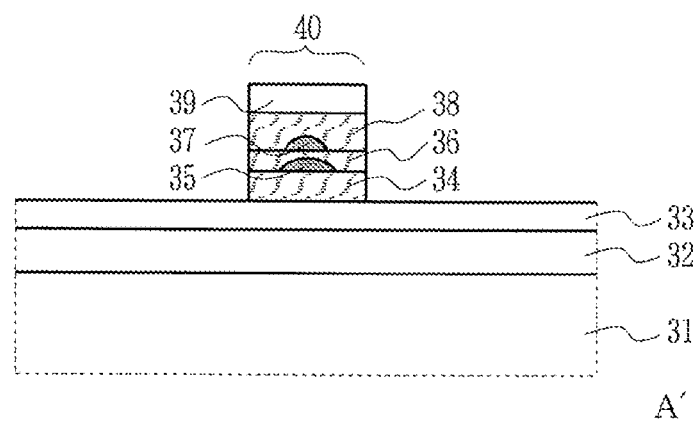

As illustrated in FIGS. 8A and 8B, pairs of coupled quantum dots where a first InAs quantum dot 35 and a second InAs quantum dot 37 are layered on top of each other are arranged in an array, and at the same time, an optical waveguide 40 in a mesa stripe form is provided.

Figure 9A:
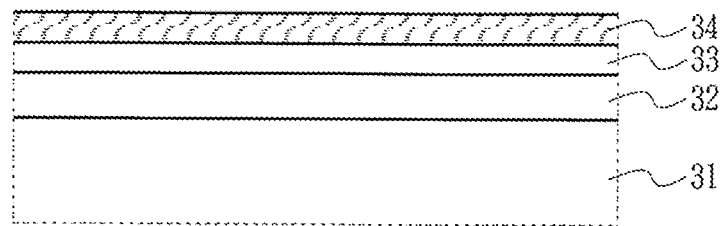
FIGS. 9A to 9C are diagrams illustrating the manufacturing process steps for a coupled quantum dots group.

Next, the manufacturing process for the coupled quantum dots group is described in reference to FIGS. 9A to 9F. First, as illustrated in FIG. 9A, a GaAs buffer layer 32 having a thickness of 300 nm, an n type GaAs layer 33 having a thickness of 100 nm, and an i type $Al_{0.3}Ga_{0.7}As$ layer 34 having a thickness of 100 nm are sequentially grown on top of a GaAs substrate 31 in accordance with an MOCVD (metal organic chemical vapor deposition) method.

Figure 9B:
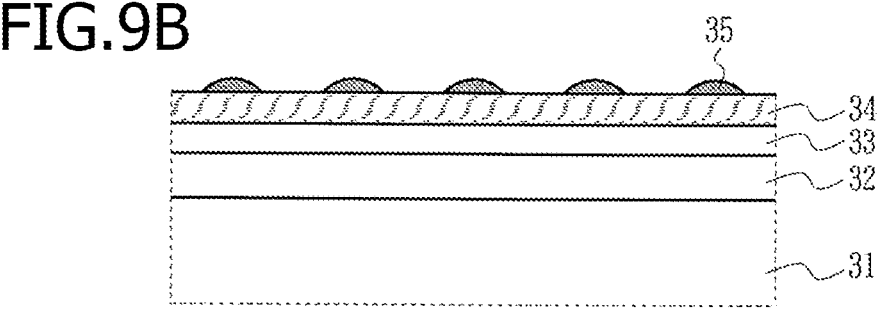
Figure 9C:
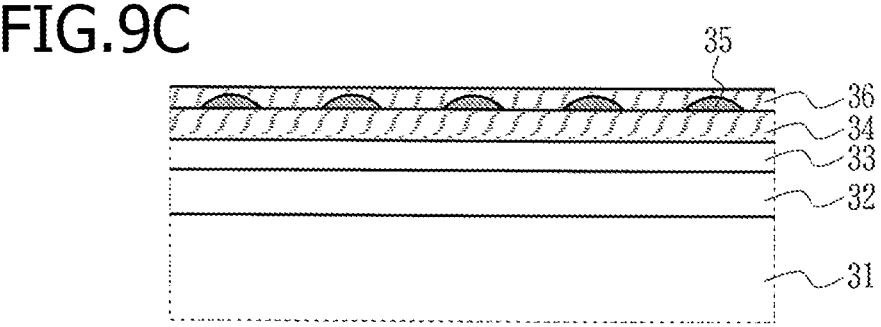

Next, as illustrated in FIG. 9B, a first InAs quantum dot 35 is formed on the i type $Al_{0.3}Ga_{0.7}As$ layer 34 through an SK mode growth. Here, the wet layer is not shown. Annealing is also carried out if necessary. Next, as illustrated in FIG. 9C, an i type $Al_{0.3}Ga_{0.7}As$ cap layer 36 having a thickness of 10 nm is formed in such a manner as to bury the first InAs quantum dot 35 therein.

Figure 9D:
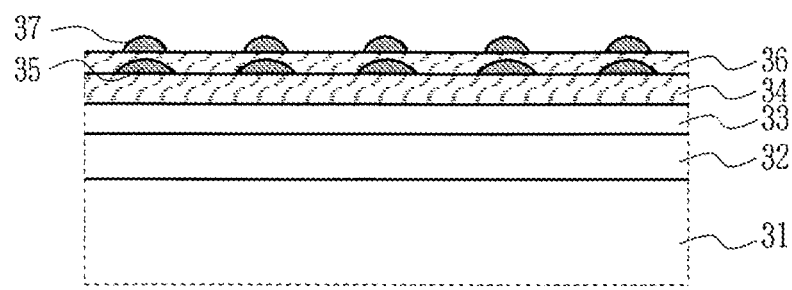
FIGS. 9D to 9F are diagrams illustrating the manufacturing process steps for a coupled quantum dots group following FIGS. 9A to 9C.

Next, as illustrated in FIG. 9D, a second InAs quantum dot 37 is grown in the SK mode on top of the i type $Al_{0.3}Ga_{0.7}As$ cap layer 36. When the second InAs quantum dot 37 is grown, the growth conditions can be adjusted so that a second InAs quantum dot 37 is grown directly above the first InAs quantum dot 35. Here, the size of the first InAs quantum dot 35 is large and the size of the second InAs quantum dot 37 is small, and thus, the two have different sizes. Quantum dots can be designed so that the size thereof is in a range from approximately 10 nm to approximately 40 nm, where it is possible for the dispersion to be approximately 10% or less.

Figure 9E:
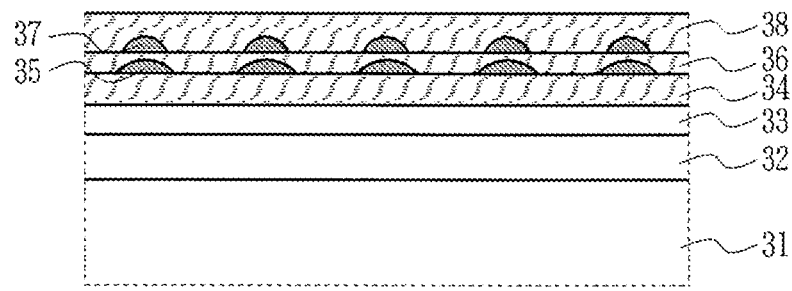
Figure 9F:
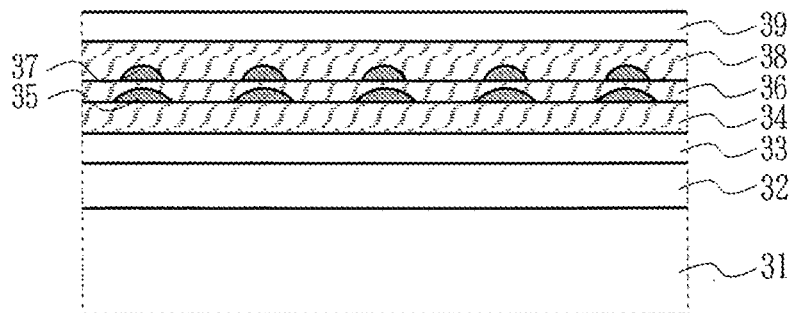

Next, as illustrated in FIG. 9E, an i type $Al_{0.3}Ga_{0.7}As$ cap layer 38 having a thickness of 300 nm is formed so as to bury the second InAs quantum dot 37 therein. Next, as illustrated in FIG. 9F, an n type GaAs layer 39 having a thickness of 200 nm is formed on top of the i type $Al_{0.3}Ga_{0.7}As$ cap layer 38. In this manner, coupled quantum dots where a pair of quantum dots, a first InAs quantum dot 35 and a second InAs quantum dot 37, is coupled are formed. Finally, mesa etching is carried out so as to form an optical waveguide in stripe form.

Next, the single-photon generating method according to Example 1 of the present invention is described. First, as illustrated in FIG. 4, a three-level lambda system is provided using energy states of $|g>$, $|e>$ and $|s>$. As illustrated in FIG. 5, the coupled quantum dots group is illuminated with first excitation light $\omega_P$ so as to generate the exciton ground state $|g>$ for the initialization. All the coupled quantum dots 2 are in the state where there are no excitons before the initialization and are converted to the $|g>$ state, that is to say, the $|G>$ state, through illumination with first excitation light cop of which the energy is no smaller than that in the $|g>$ state and no greater than that in the $|s>$ state.

As described above, the wavelength $\lambda_P$ of the first excitation light $\omega_P$ $(=2\pi c/\omega_P)$ corresponds to the band gap of the material for the quantum dots to which the sum of the binding energies within the dots of the electrons and holes corresponding to the $|g>$ state is added. In the case of resonant excitation, this energy is tuned with $\omega_P$.

In the case of non-resonant excitation, the power of the pump is gradually increased to approximately 100 mW starting from an extremely weak value of 1 mW or less at the stage of characteristic inspection of the apparatus having a predetermined pump pulse width for the setting of energy at a level a bit higher than $\lambda_P$. At this time, the fluorescence intensity is plotted and a point at which excitation saturates is sampled so that the power is set to this value, or the power is set to a value a bit smaller than this so that the multiplex excitation probability is made small at each pair of coupled quantum dots. Even in the case where multiplex excitation occurs at this phase, there are virtually no effects on the single-photon generating property of the present invention, which is based on the principal of the invention.

In the case of quasi-resonant excitation, there is a wait until the energy drops to the ground state within the band, such as phonon scattering. The time required for this is 1 ns or less. In the case of either the resonant excitation or the quasi-resonant excitation, the purity of the spectrum of the pump beam is irrelevant, and a conventional laser is used. Here, a non-resonant pump having energy that is smaller than the difference in the energy between $|e>$ and $|g>$ is used so that a non-resonant laser beam (detuning $\Delta$) having an intensity $\Omega$ and a pulse width $\tau$ in such a polarization state as to be able to interact with the coupled quantum dots is emitted.

Next, as illustrated in FIG. 6, the single Dicke state $|S_1>$ is generated through illumination with the second excitation light $\omega_a$. Here, a non-resonant pump having energy that is smaller than the difference in the energy between $|e>$ and $|g>$ is used so that a non-resonant laser beam (detuning $\Delta$) having an intensity $\Omega$ and a pulse width $\tau$ in such a polarization state as to be able to interact with the coupled quantum dots is emitted. The non-resonant laser beam used as the second excitation light $\omega_a$ is subjected to Raman scattering, and part of the beam is converted to a Stokes ray $\omega_s$ having a wavelength that is longer than that. In this manner, a Stokes photon $\omega_s$ due to Raman scattering is generated. N-coupled quantum dots are aligned in a line within the optical waveguide, and therefore, Raman scattering occurs efficiently. The conversion from $|G>$ to $|S_1>$ as a result of Raman scattering is referred to as excitation to a symmetric state due to Raman scattering.

In this illumination step with a non-resonant laser beam, the pump beam intensity is adjusted to an appropriate value so that the amplitudes $f_2, f_3, \ldots$ of the two or more excitation states $|S_2>$ are made sufficiently small. The value of this pump beam intensity is set under the same concept as in the case of the setting of the power of the first excitation light $\omega_P$. That is to say, a point where the value of the probability of a single photon occurring is sufficiently small, though not zero, is found while gradually increasing the power of the second excitation light $\omega_a$ starting from an extremely weak value, for example, 1 mW or less, to approximately 100 mW, for example, at the stage of characteristic inspection.

An appropriate occurrence probability depends on the characteristics of the photo number detector. That is to say, it is acceptable for the occurrence probability of a single photon to be a value that is very close to 1 in the case where the photon number detector is almost ideal. In the case where the performance of the photon number detector is inferior, however, the occurrence probability of a single photon may sometimes need to be approximately 0.001, for example. In such a case, priority is placed on the single-photon generating property and the rate at which a photon is generated is sacrificed. In the Stokes ray $\omega_s$ that has been generated through Raman scattering, n photon states correspond to each n excitation state $|S_n>$. The photon number in this scattered light is measured and only a case where one photon is detected is used, and in the other cases, the process is started all over again.

The meticulous setting of the wavelength $\lambda_a$ of the second excitation light corresponds to an issue to which extent detuning is carried out. In accordance with a manner for finding this value, the above-described procedure for setting the power is carried out starting from a sufficiently great detuning, for example, the value that is half of the energy between the $|g>$ state and the $|e>$ state. Then, the procedure for setting the power is repeated while gradually reducing the detuning, and thus, a region is found where no undesirable transition between levels occurs while Raman scattering takes place, and the wavelength $\lambda_a$ is set in this region. The occurrences of undesirable transitions can be detected by observing noise at the following stage where a single photon is generated.

Next, as illustrated in FIG. 7, the coupled quantum dots group returns from the single Dicke state $|S_1>$ to the ground state $|G>$ due to Raman scattering through illumination with the third excitation light $\omega_S$, and at the same time, a single anti-Stokes photon $\omega_a$ is generated.

The parameters for the third excitation light are set under the same concept as the setting of the parameters for the first and second excitation lights. In the case of the third excitation light, the Raman transition is the transition from the initial state, which is a single Dicke state $|S_1>$, to the ground state $|G>$, and therefore, there is almost no possibility of the occurrence of other transitions, and thus, no problem arises even when the pump intensity is considerably high and the operation margin is great.

In Example 1 of the present invention, a multilayer-type coupled quantum dots group formed in the SK growth mode is arranged along a line, and therefore, the coherent coupling with a laser beam due to Raman scattering can be increased. In addition, the optical axis can be set so that the excitation beam progresses along this line, and thus, the direction in which the generated Raman scattered light emits can be restricted, and the efficiencies in the photon number detection and the taking out of a single photon increase.

In addition, the optical waveguide in mesa stripe form is provided so that a laser beam from the outside can be guided through this optical guide, and therefore, the direction in which the generated Raman scattered light emits can be restricted. In this case, the spread of the beam is restricted by the width of this optical waveguide, and therefore, the coupling of the laser beam and the quantum dot system is further intensified. In addition, it is possible to bend the optical waveguide to various forms, and therefore, the freedom in the arrangement of the quantum dots is great.

Example 2

Figure 10A:
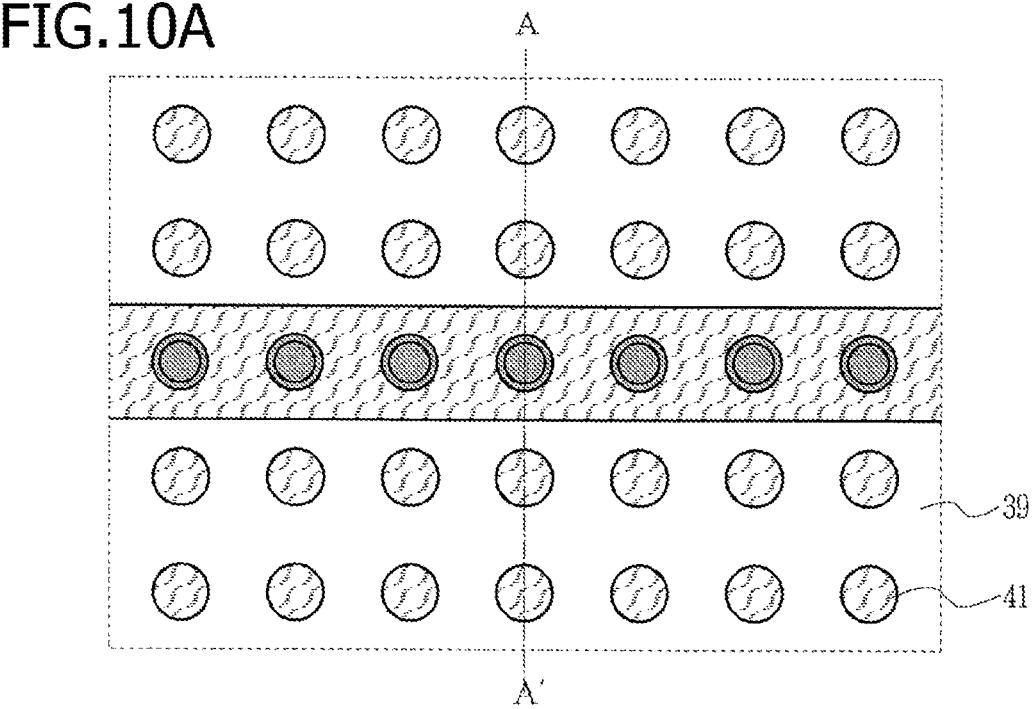
FIGS. 10A and 10B are diagrams illustrating the main portion of the single-photon generator according to Example 2 of the present invention.
Figure 10B:
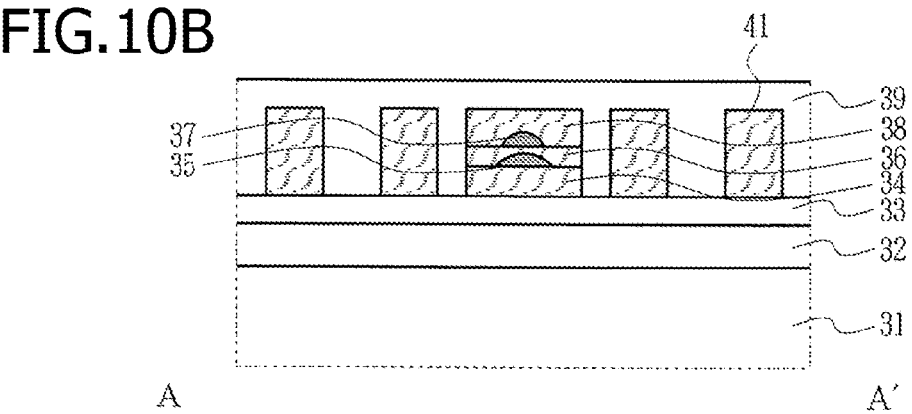

Next, the single-photon generating method according to Example 2 of the present invention is described in reference to FIGS. 10A and 10B. FIGS. 10A and 10B are diagrams illustrating the main portion of the single-photon generator according to Example 2 of the present invention. Here, a coupled quantum dots group that realizes a three-level lambda system is described. FIG. 10A is a schematic diagram and FIG. 10B is a cross-sectional diagram along a single-dotted chain line A-A' in FIG. 10A.

As illustrated in FIGS. 10A and 10B, after the formation of a mesa in stripe form, an i type $Al_{0.3}Ga_{0.7}As$ layer is again deposited on both sides of the coupled quantum dot array where a first InAs quantum dot 35 and a second InAs quantum dot 37 are layered on top of each other. Next, pillars 41 that are arranged in a two-dimensional matrix are formed, and these pillars 41 are buried in an n type GaAs layer 39 so that an optical waveguide is formed of a photonic crystal. Here, the single-photon generating method is the same as in Example 1 that is described above, and therefore, the description thereof is not repeated.

In Example 2 of the present invention, an optical waveguide is formed of a photonic crystal, and therefore, the same effects as of the above-described optical waveguide in mesa stripe form in Example 1 are gained.

Example 3

Figure 11:
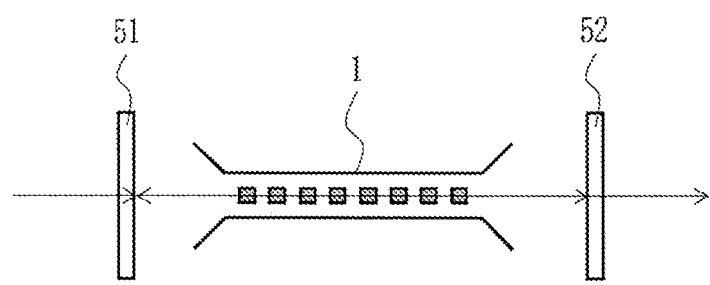
FIG. 11 is a schematic diagram illustrating the configuration of the single-photon generator according to Example 3 of the present invention.

Next, the single-photon generator according to Example 3 of the present invention is described in reference to FIG. 11. FIG. 11 is a schematic diagram illustrating the configuration of the single-photon generator according to Example 3 of the present invention, which is the same as in Example 1 except that a Fabry-Perot resonator is provided on the outside, and therefore, only the basic portion is illustrated. As illustrated in FIG. 11, a pair of half mirrors 51 and 52 are provided so as to sandwich the optical waveguide 40 in mesa stripe form that includes a coupled quantum dots group and so as to be perpendicular to the optical axis.

In this case, such a mechanism can be provided that the resonant frequency of the Fabry-Perot resonator can be made the same as either or both of the frequency of the pump beam and the Stokes ray, or can be controlled from the outside so as to be the same as either of them, and thus, the efficiency or the rate of the conversion can be increased. As a result, the coupling of the light mode and the quantum dot system can be further intensified, and in addition, a reduction in the efficiency due to natural emission and the generation of noise can be reduced. In addition, the direction in which the generated scattered light emits can be restricted, which increases the efficiency in the photon number detection or the taking out of a single photon.

In order for the resonant frequency of the Fabry-Perot resonator to be able to be tuned, a moving mechanism using a piezoelectric element is provided in at least one half mirror so that the half mirror is movable in the directions along the optical axis. Alternatively, an optical crystal of which the index of refraction varies due to an electrical field may be provided at a point along the optical path so that the index of refraction can be varied through the application of an electrical voltage so as to tune the wavelength. In addition, an optical waveguide using a photonic crystal in the same manner as in Example 2 may be provided instead of the optical waveguide 40 in mesa stripe form.

Example 4

Figure 12:
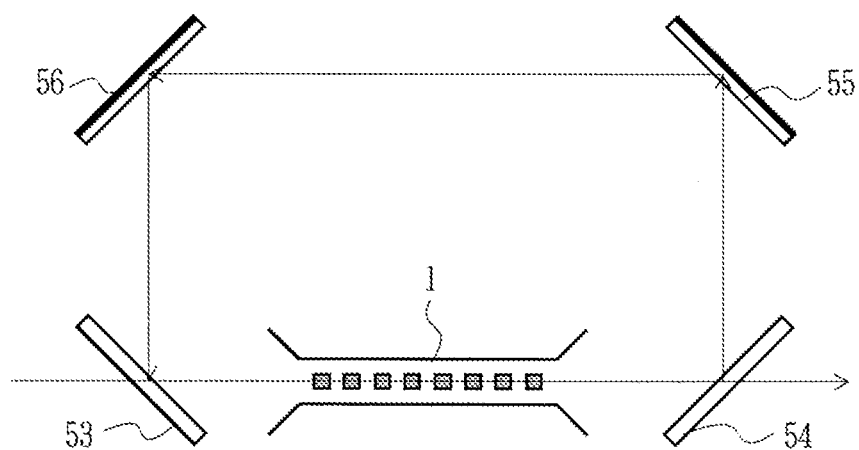
FIG. 12 is a schematic diagram illustrating the configuration of the single-photon generator according to Example 4 of the present invention.

Next, the single-photon generator according to Example 4 of the present invention is described in reference to FIG. 12. FIG. 12 is a schematic diagram illustrating the configuration of the single-photon generator according to Example 4 of the present invention, which is the same as in Example 1 except that a ring type resonator is provided, and therefore, only the basic portion is illustrated. As illustrated in FIG. 12, two half mirrors 53 and 54 of which the optical path includes as its part the optical waveguide 40 in mesa stripe form that includes a coupled quantum dots group are provided, and a ring resonator is formed of the two mirrors 55 and 56.

Thus, a ring resonator is provided so that the coupling and the directivity of the pump beam and the coupled quantum dot system can be reinforced. In this case as well, the wavelength may be tuned by providing a moving mechanism using a piezoelectric element so that one half mirror 54 and the mirror 55 are linked and move in sync. Alternatively, an optical crystal of which the index of refraction varies due to an electrical field may be provided within the optical path in ring form so that the wavelength can be tuned by varying the index of refraction due to the electrical voltage. In addition, an optical waveguide using a photonic crystal may be provided in the same manner as in Example 2 instead of the optical waveguide 40 in mesa stripe form.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A single-photon generator comprising: a coupled quantum dots group, which is a set of a number of coupled quantum dots made of a coupled pair of quantum dots having different ground quantum levels; a first pumping light illumination means for illuminating the coupled quantum dots group with first excitation light so that a multiple number of coupled quantum dots are made to be in an exciton ground state; a second pumping light illumination means for illuminating the coupled quantum dots group in the exciton ground state with second excitation light so that the coupled quantum dots group is made in the excited Dicke state through Raman scattering; a photon number detection means for detecting the number of photons in the Raman scattering light due to the Raman scattering; a control means for controlling the second pumping light illumination means so that the excited Dicke state becomes a single excited Dicke state using the detection results by the photon number detection means; and a third pumping light illumination means for illuminating the coupled quantum dots group in the single excited Dicke state with third excitation light so that a single photon is generated accompanying the transition of the coupled quantum dots group from the single excited Dicke state to the exciton ground state due to Raman scattering.

2. The single-photon generator according to claim 1, wherein the second excitation light is a non-resonant laser beam.

3. The single-photon generator according to claim 1, wherein the coupled quantum dots are linearly aligned along the respective optical axes of the first through third excitation light.

4. The single-photon generator according to claim 1, wherein the coupled quantum dots in each pair are coupled quantum dots where a quantum dot in the first layer in a Stranski-Krastanov growth mode and a quantum dot in the second layer formed so as to be positionally aligned above the quantum dot in the first layer with a middle layer in between are coupled.

5. The single-photon generator according to claim 1, wherein the linearly aligned coupled quantum dots group is placed inside an optical waveguide, which is either a mesa type optical waveguide or a photonic crystal optical waveguide.

6. The single-photon generator according to claim 5, wherein the optical waveguide that includes the linearly aligned coupled quantum dots group is placed inside a Fabry-Perot type resonator.

7. The single-photon generator according to claim 5, wherein the optical waveguide that includes the linearly aligned coupled quantum dots group is placed inside a ring type resonator.

8. A single-photon generating method, comprising: illuminating a coupled quantum dots group, which is a set of a number of coupled quantum dots where a couple of quantum dots having different ground quantum levels are coupled, with first excitation light so that a multiple number of coupled quantum dots are made in an exciton ground state; illuminating the coupled quantum dots group in the exciton ground state with second excitation light so that the exciton ground state becomes a single excited Dicke state using the detection results by a photon number detection means that detects the number of photons in the Raman scattering light due to Raman scattering; and illuminating the coupled quantum dots group in the single excited Dicke state with third excitation light so that a single photon is generated accompanying the transition of the coupled quantum dots group from the single excited Dicke state to the exciton ground state due to Raman scattering.

9. The single-photon generating method according to claim 8, wherein three energy states, which are two exciton splitting energy states from among the four energy states of each coupled quantum dot and the higher energy state between the two exciton localized states, are used in the Raman scattering.

10. The single-photon generating method according to claim 8, wherein the second excitation light is a non-resonant laser beam.

* * * * *